United States Patent [19]

Patel

[11] Patent Number: 5,884,179
[45] Date of Patent: Mar. 16, 1999

[54] OPTIMIZED ROUTING OF TERMINATING CALLS WITHIN A MOBILE TELECOMMUNICATIONS NETWORK

[75] Inventor: Mahesh Patel, Plano, Tex.

[73] Assignee: Ericsson Inc., Research Triangle Park, N.C.

[21] Appl. No.: 710,347

[22] Filed: Sep. 16, 1996

[51] Int. Cl.⁶ .................................................. H04Q 7/38
[52] U.S. Cl. .................... 455/445; 455/422; 455/428; 455/432
[58] Field of Search .................. 455/422, 428, 455/432, 433, 435, 445, 455, 456, 560, 417

[56] References Cited

U.S. PATENT DOCUMENTS

| | | | |
|---|---|---|---|
| 4,833,701 | 5/1989 | Comroe et al. | 379/60 |
| 4,901,340 | 2/1990 | Parker et al. | 379/60 |
| 5,018,187 | 5/1991 | Marinho et al. | 379/60 |
| 5,210,787 | 5/1993 | Hayes et al. | 379/60 |
| 5,282,240 | 1/1994 | Buhl et al. | 379/59 |
| 5,325,362 | 6/1994 | Aziz | 370/94.3 |
| 5,345,498 | 9/1994 | Mauger | 379/58 |
| 5,353,340 | 10/1994 | Kunz | 379/60 |
| 5,400,390 | 3/1995 | Salin | 379/59 |
| 5,406,616 | 4/1995 | Bjorndahl | 379/59 |
| 5,423,068 | 6/1995 | Hecker | 455/56.1 |
| 5,440,614 | 8/1995 | Sonberg et al. | 379/60 |
| 5,442,633 | 8/1995 | Perkins et al. | 370/94.1 |
| 5,454,027 | 9/1995 | Kennedy et al. | 379/60 |
| 5,467,381 | 11/1995 | Peltonen et al. | 379/58 |
| 5,497,412 | 3/1996 | Lannen et al. | 379/60 |
| 5,504,804 | 4/1996 | Widmark et al. | 379/63 |
| 5,526,400 | 6/1996 | Nguyen | 379/59 |
| 5,561,840 | 10/1996 | Alvesalo et al. | 455/33.1 |
| 5,697,064 | 12/1997 | Okamoto et al. | 455/33.1 |
| 5,758,281 | 5/1998 | Emery et al. | 455/428 |
| 5,761,195 | 6/1998 | Lu et al. | 370/329 |

FOREIGN PATENT DOCUMENTS

| | | | |
|---|---|---|---|
| WO 95/09514 | 4/1995 | WIPO | H04Q 7/38 |
| WO 96/20574 | 7/1996 | WIPO | H04Q 7/38 |

OTHER PUBLICATIONS

Brini et al, "International roaming in digital cellular networks", Inter. Switching Symposium, Oct. 1992, vol. 1, pp. 132–136.

Beller, "Call Delivery to Portable Telephones Away from Home Using the Local Exchange Network", IEEE Communications—Rising to the Heights, Jun. 1991, pp. 948–953.

PCT International Search Report, Mar. 3, 1998, File No. PCT US 97/16479.

Primary Examiner—Reinhard J. Eisenzopf
Assistant Examiner—Duc Nguyen
Attorney, Agent, or Firm—Jenkens & Gilchrist

[57] ABSTRACT

A call setup signal is routed to the gateway mobile switching center (GMSC) serving a public land mobile network (PLMN) associated with a called mobile station. The GMSC then sends a signal including data identifying the originating switch to the home location register (HLR) associated with the called mobile station. Upon determining that it would be more efficient and direct for the originating switch to release the first call connection to the GMSC and to re-originate a new call setup signal directly towards the mobile switching center (MSC) currently serving the called mobile station, the HLR transmits a Mobile Application Part (MAP) based signal to the originating switch. As a result, the originating switch releases the original call connection and re-originates a call setup signal using a roaming number identifying the MSC currently serving the mobile station as a destination address.

27 Claims, 6 Drawing Sheets

OPTIMIZED ROUTING OF TERMINATING CALLS WITHIN A MOBILE TELECOMMUNICATIONS NETWORK

CROSS REFERENCE TO RELATED APPLICATIONS

This application is related to U.S. application for patent Ser. No. 08/710,346, filed Sep. 9, 1996, entitled "Optimized Routing Of Mobile Calls Within A Telecommunications Network" (Docket No. 27943/96), to U.S. application for patent Ser. No. 08/710,349, filed Sep. 9, 1996, entitled "Optimized Routing Of Calls To Roaming Subscribers Within A Telecommunications Network" (Docket No. 27943/100), and to U.S. application for patent Ser. No. 08/710,345, filed Sep. 9, 1996, entitled "Using Local Number Portability Database To Solve Call Tromboning" (Docket No. 27943/101), all filed concurrently herewith and the contents of such applications are incorporated by reference herein.

BACKGROUND OF THE INVENTION

1. Technical Field of the Invention

The present invention relates to a telecommunications network and, in particular, to the optimal routing of terminating calls towards a mobile station.

2. Description of Related Art

With the advent and development of mobile telecommunications systems, telecommunications users are no longer physically bound to wireline terminals or fixed locations for telecommunications network communications. Using the added capabilities of roaming and interoffice handoffs, mobile subscribers may travel between multiple Public Land Mobile Networks (PLMNs) utilizing the same telephone number and the same mobile station to originate outgoing calls and to receive incoming calls. Thus, a mobile subscriber may access telecommunications service from multiple locations utilizing multiple service providers with any incurred fees being charged to a single subscription. Furthermore, calling parties do not necessarily have to know where the mobile subscriber is physically located in order to establish a call connection. Data signals between visitor location registers (VLRs) and a home location register (HLR) automatically update and store subscriber information, in particular subscriber location information, enabling the network to reroute incoming calls to the appropriate mobile switching center (MSC) serving the roaming mobile subscriber. Furthermore, regardless of which MSC is currently serving the mobile station, the VLR associated with the serving MSC communicates with the HLR assigned to the mobile station to retrieve the requisite subscriber data, including subscriber feature data and billing data, and provides uniform mobile service to the mobile station.

Conventionally, if a mobile station associated with a New York (N.Y.) mobile telecommunications network is traveling in Los Angeles (L.A.), an incoming call towards the roaming mobile station is first routed to the gateway mobile switching center (GMSC) serving the N.Y. public land mobile network (PLMN) associated with the mobile station. Thereinafter, the N.Y. GMSC performs an interrogation with the home location register (HLR) associated with the mobile station to determine the current location of the roaming mobile station. Upon determining the identity of the L.A. mobile switching center (MSC) currently serving the N.Y. mobile station, the received incoming call is rerouted by the N.Y. GMSC to the serving L.A. MSC to enable a speech connection between the calling party terminal and the roaming mobile station.

Accordingly, if the calling party is originating a call setup signal from L.A., a first trunk call connection between the L.A. telecommunications network and the GMSC serving the home PLMN is initially established and then a second trunk call connection between the GMSC back to the L.A. MSC currently serving the mobile station is established. As a result, a "tromboning" of trunk call connections through N.Y. is performed in order to establish a call connection between two telecommunications subscribers both located in L.A.

Such "tromboning" trunk call connections are disadvantageous for a number of reasons. Unnecessary trunk connections have to be established and maintained in order to enable two subscribers who are locally located to communicate with each other and result in unnecessary seizure of valuable network resources. Additionally, even though the called party mobile station is receiving an incoming call from a calling party terminal located within the same local access transport area (LATA), such as L.A., the called party mobile station has to incur long distance charges for forwarding the call connection from his or her home PLMN back to the visited PLMN. Furthermore, the calling party also has to incur long distance charges to N.Y. for calling another mobile station located within the same PLMN.

Accordingly, there is a need for a mechanism to enable the serving mobile telecommunications network to perform optimal routing of a mobile call towards a roaming mobile station.

SUMMARY OF THE INVENTION

The present invention discloses a method and system for optimally routing a call connection within a mobile telecommunications network. Whenever the serving home location register (HLR) determines that the calling party and the called party mobile station for a particular call setup are optimally located with each other, the serving HLR instructs the originating telecommunications node to release the initial call setup connection and to re-originate a new call connection directly towards the mobile switching center (MSC) currently serving the called party mobile station.

A telecommunications node serving a calling party terminal originates a first call setup signal towards a mobile telecommunications network associated with a called party mobile station. A gateway mobile switching center (GMSC) serving the mobile telecommunications network associated with the called party mobile station receives the transmitted call setup signal and queries the home location register (HLR) associated with the destination mobile station to locate the mobile station and to properly reroute the incoming call. As a result, a first signal requesting routing instruction is transmitted from the GMSC to the HLR. The first signal transmitted to the HLR includes data identifying the telecommunications node serving the calling party terminal. The first signal further includes data indicating whether the originating telecommunications node is capable of performing optimal routing. The HLR, in turn, transmits a second signal to the mobile switching center (MSC) currently serving the mobile station requesting a roaming number. Upon receiving the roaming number back from the serving MSC, the HLR compares the received data identifying the telecommunications node with the received roaming number identifying the serving MSC and determines whether it would be more optimal for the telecommunications node to directly establish a call connection to the serving MSC. In response to an affirmative determination, the HLR transmits a third signal to the telecommunications node instructing the telecommunications node to disconnect the existing call connection established as a result of the first call setup signal and to re-originate a new call setup signal directly towards the serving MSC by using the included roaming number as a called party address. A call connection without the unnecessary tromboning trunk connections is then established between the calling party and the called party mobile station.

The telecommunications node may include a local exchange serving a wireline calling party terminal. As an alternative, the telecommunications node may include a mobile switching center (MSC) serving a calling party mobile station.

The HLR associated with the destination mobile station may perform the step of determining whether to instruct the telecommunications node to re-originate a new call setup signal directly towards the serving MSC in order to optimize the call connection. As an alternative, a separate processing database associated with the HLR may make the determination.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
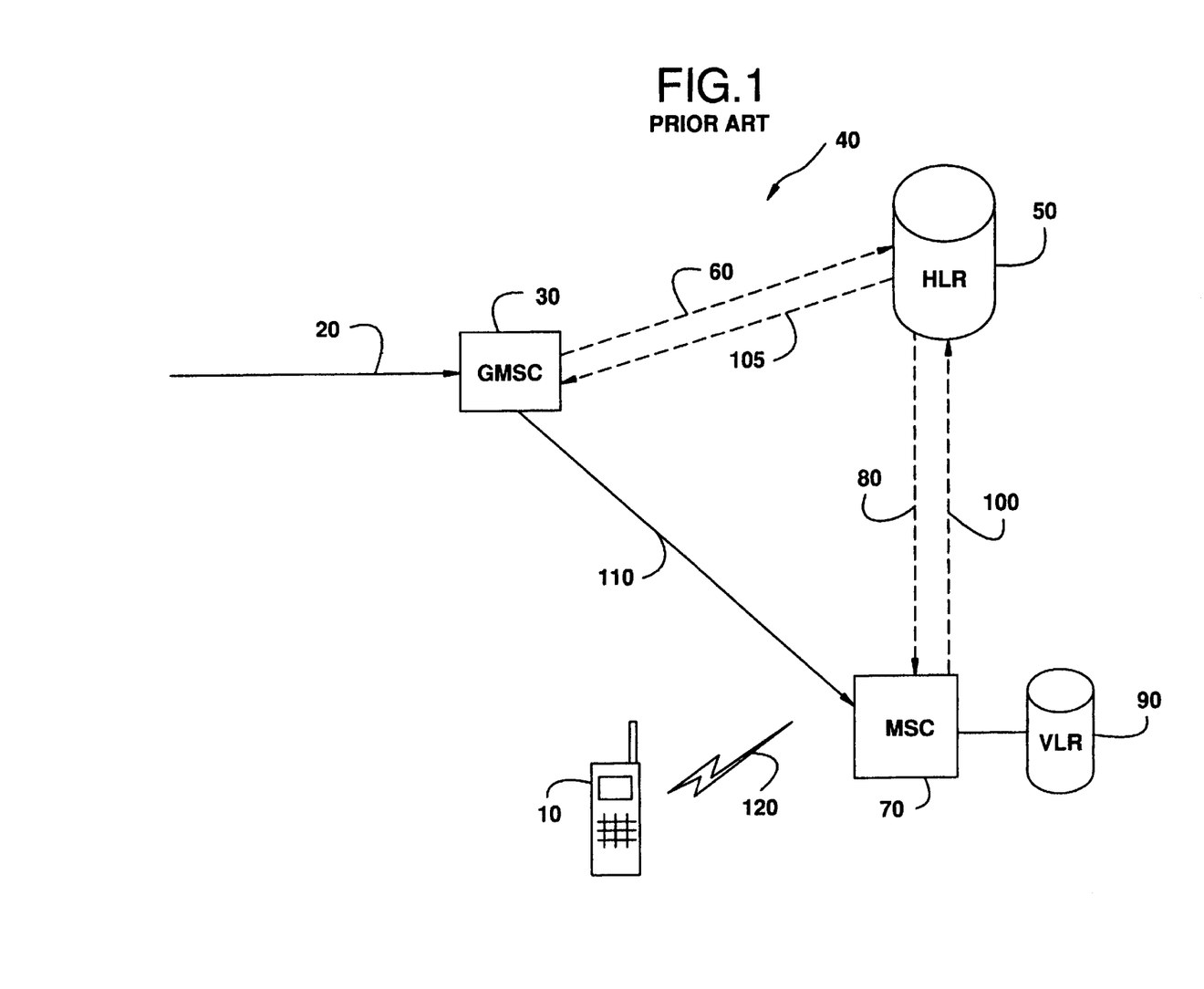
FIG. 1 is a block diagram of a mobile telecommunications network illustrating the routing of an incoming call to a destination mobile station.

FIG. 1 is a block diagram of a telecommunications network illustrating a mobile telecommunications network routing an incoming call to a destination mobile station 10. Whenever a telecommunications subscriber (mobile or wireline) originates a call connection by dialing a directory number, such as a Mobile Subscriber Integrated Service Digital Network (MSISDN) number, associated with the mobile station 10, a call setup signal 20, such as an Initial Address Message (IAM), is received by the gateway mobile switching center (GMSC) 30 serving the public land mobile network (PLMN) 40 associated with the destination mobile station 10. Whenever the IAM signal 20 is received by a particular telecommunications node, such as the GMSC 30, a corresponding call connection (i.e., trunk call connection) is further established between the originating telecommunications node and the receiving telecommunications node.

Because the mobile station 10 is not restricted to one particular location or PLMN, the GMSC 30 receiving the IAM signal needs to interrogate the home location register (HLR) 50 associated with the mobile station 10 to determine the current location of the mobile station 10. Accordingly, a signal 60 requesting routing instruction is transmitted from the GMSC 30 to the HLR 50. The HLR, in turn, determines the identity of the mobile switching center (MSC) 70 currently serving the mobile station 20 and further transmits a signal 80 requesting a roaming number to the identified MSC 70. With the help of subscriber data stored at an attached visitor location register (VLR) 90, the serving MSC 70 identifies the called mobile station 10 traveling within its coverage area and, as a result, returns the roaming number representing the called mobile station located within the serving MSC 70 to the HLR 50 (signal 100). The HLR 50 then forwards the received roaming number back to the GMSC 30 (signal 105). By utilizing the received roaming number identifying the serving MSC 70, the GMSC 30 reroutes the received call setup signal 20 to the serving MSC 70. Accordingly, a call connection 110, such as a trunk connection, is correspondingly established from the GMSC 30 to the serving MSC 70. Once the rerouted call setup signal is received by the serving MSC 70, the mobile station 10 is paged and a call connection 120 over a radio channel between the mobile station 10 and the serving MSC 70 is established.

Figure 2:
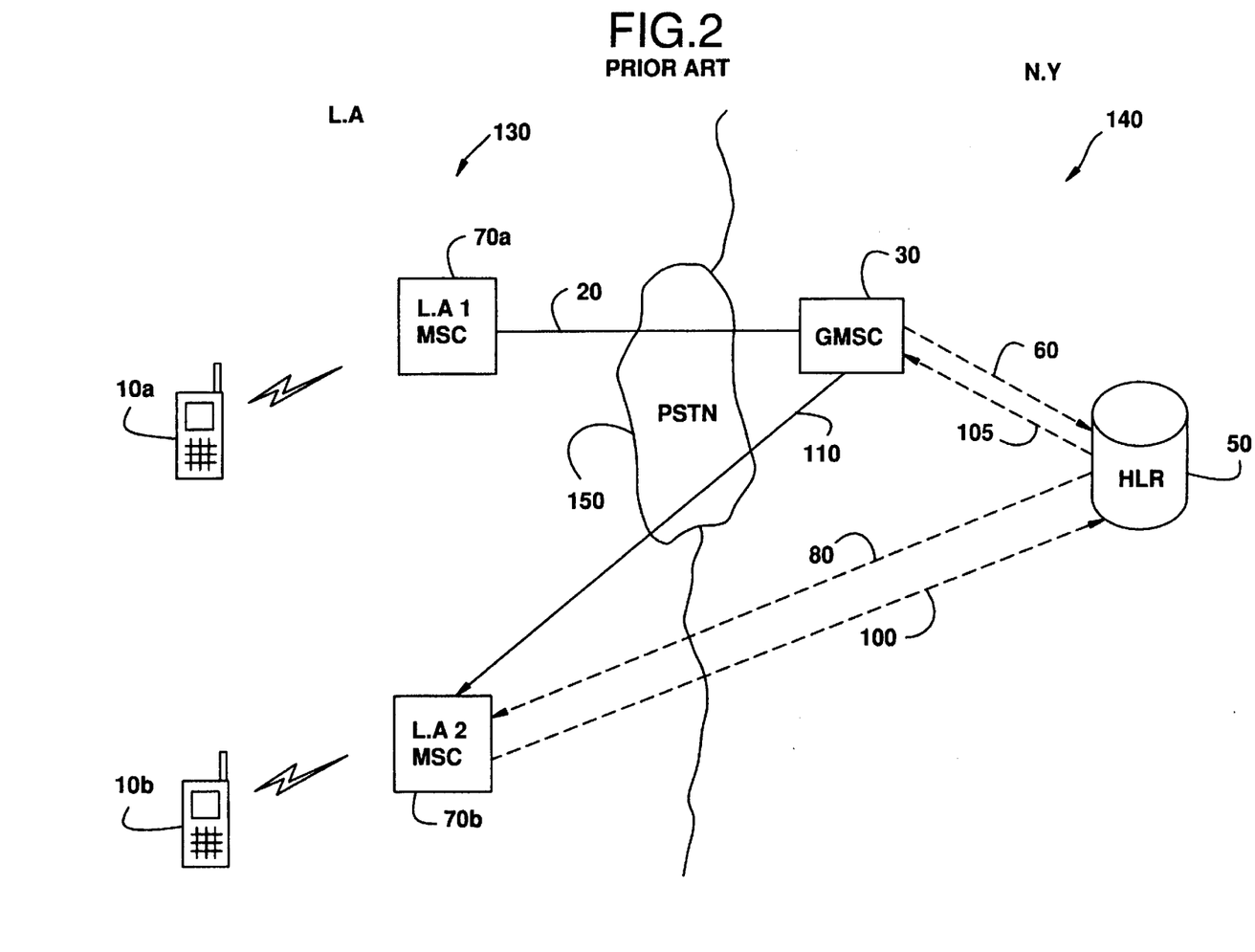
FIG. 2 is a block diagram of a telecommunications network illustrating the tromboning of trunk connections to establish a call connection between a calling party terminal and a roaming called party mobile station.

Due to such HLR interrogation and rerouting of an incoming call by a serving GMSC, inefficient and wasteful call connections are often times established towards a roaming mobile station. Reference is now made to FIG. 2 illustrating the "tromboning" of trunk connections within a telecommunications network to establish a call connection between a calling party terminal 10a and a roaming called party mobile station 10b. The called party mobile station 10b is associated with the N.Y. PLMN 140 and is currently roaming within the visited L.A. PLMN 130. When the mobile station 10a, also located within the L.A. PLMN 130, originates an outgoing call connection towards the called party mobile station 10b, a call setup signal is originated by the L.A. MSC 70a serving the calling party mobile station 10a. The originated call setup signal, such as an IAM signal, is then routed through the connected Public Switched Telephone Network (PSTN) 150 and delivered to the GMSC 30 serving the N.Y. PLMN 140. Accordingly, a first trunk call connection, as illustrated by a solid line 20, is established between the first L.A. MSC 70a and the GMSC 30. As described above in connection with FIG. 1, the GMSC 30 then performs HLR interrogation by transmitting a connection-less signal 60 towards the HLR 50. In order to retrieve a network number that can be utilized by the GMSC 20 to reroute the incoming call, the HLR 50 requests a roaming number from the serving MSC 70b. Because the MSC 70b serving the called party mobile station 10b is another MSC located within the L.A. PLMN 130 (hereinafter called the second L.A. MSC 70b), a Mobile Application Part (MAP) based signal 80 is sent from the N.Y. HLR 50 to the second L.A. MSC 70b. The second L.A. MSC 70b then returns the roaming number back to the HLR 50 via another MAP based signal 100. The received MAP based signal is then transmitted back to the GMSC 30 via signal 105. Utilizing the received roaming number identifying the second L.A. MSC 70b as the MSC currently serving the mobile station 10*b*, the GMSC 30 reroutes the call setup signal to the second L.A. MSC 70*b*. Such a rerouting creates a second trunk call connection 110 between the GMSC 30 and the second L.A. MSC 70*b*.

A speech connection between the calling party mobile station 10*a* in Los Angeles and the called party mobile station 10*b* also in Los Angeles, via the New York GMSC 30, is thus established using the first call connection 20 and the second call connection 110. Such a "tromboning" of trunk call connections is conventionally unavoidable because the current location of the called party mobile station 10*b* cannot be determined until the call setup signal reaches the GMSC 30. Unfortunately, tromboning of trunk call connections is wasteful and inefficient. It further forces mobile subscribers to incur additional fees for rerouting incoming calls from their home PLMN to the visited PLMN. Furthermore, it forces calling parties to incur unnecessary long distance charges.

Figure 3:
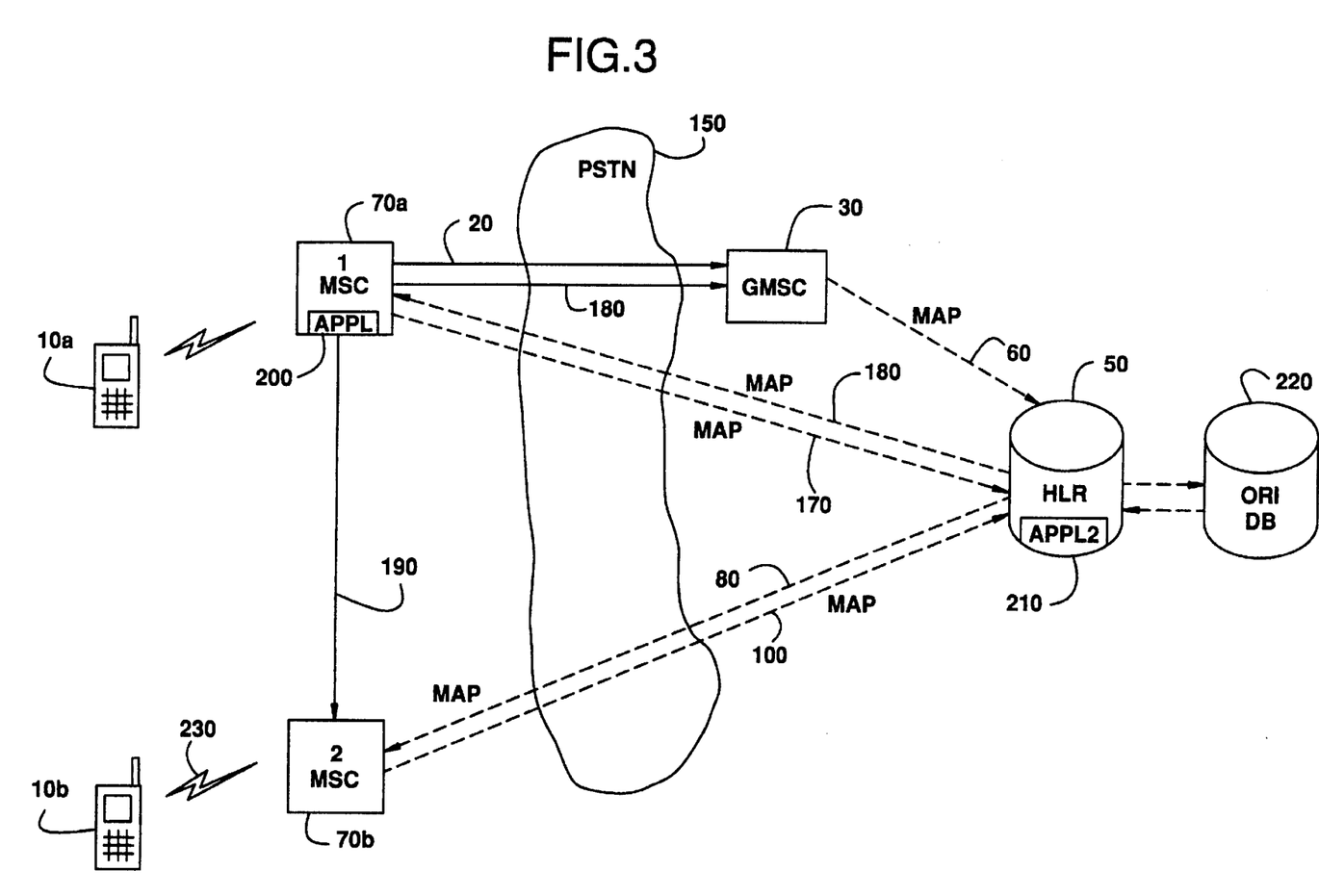
FIG. 3 is a block diagram of a telecommunications network illustrating the optimized routing of a call connection from a first mobile switching center (MSC) serving the calling party mobile station towards a second MSC serving the destination mobile station.
Figure 4:
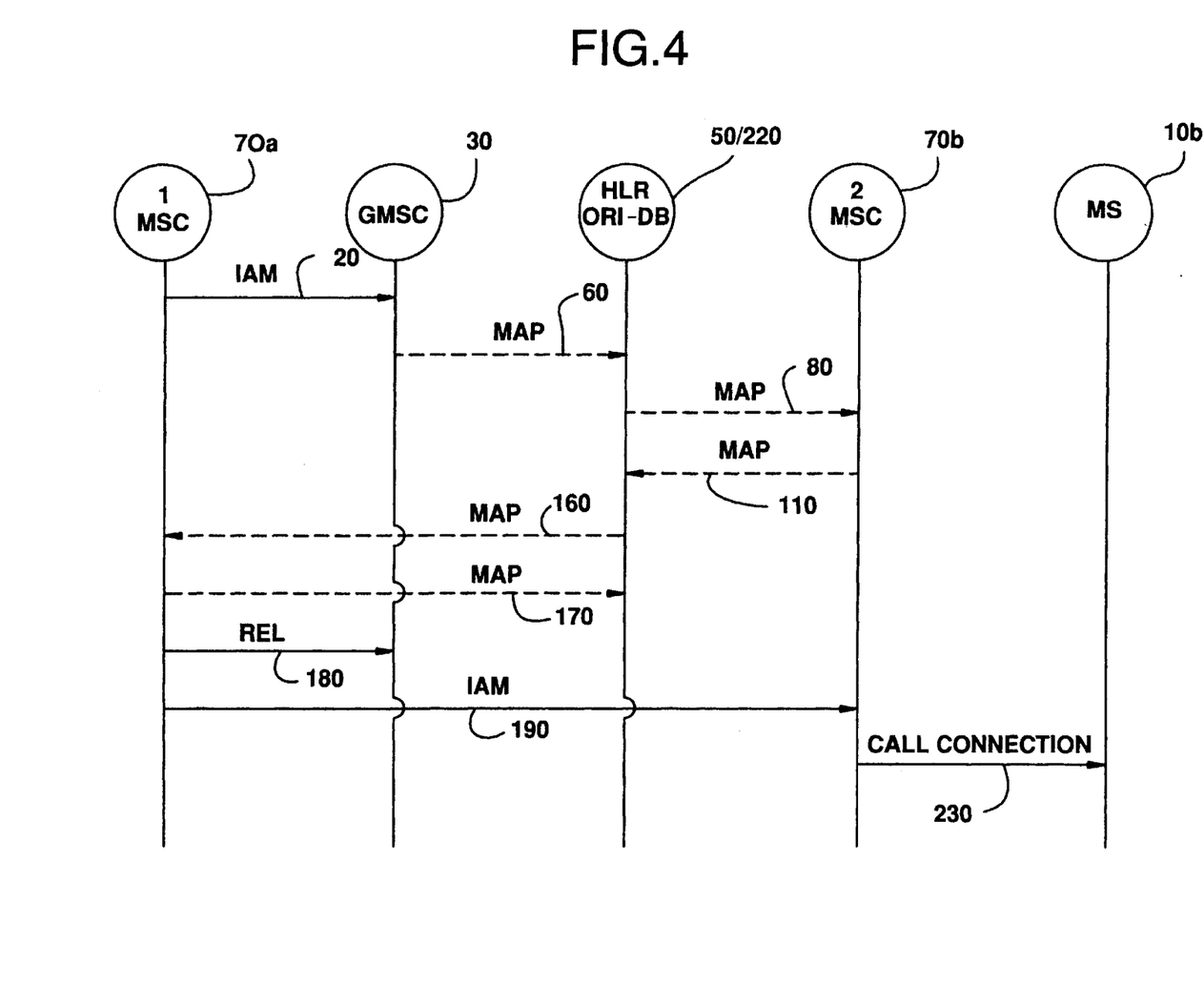
FIG. 4 is a signal sequence diagram illustrating the optimized routing of a call connection from a first mobile switching center (MSC) serving the calling party mobile station towards a second MSC serving the destination mobile station.

Reference is now made to both FIGS. 3 and 4 illustrating the optimized routing of a call connection from a first MSC 70*a* serving the calling party mobile station 10*a* towards a second MSC 70*b* serving the called party mobile station 10*b*. In a manner similar to a conventional routing of an incoming call, the first MSC 70*a* originates an IAM signal towards the GMSC 30 serving the home PLMN associated with the called party mobile station 10*b*. The originated IAM signal further includes first data indicating whether the first MSC 70*a* serving the calling party mobile station boa is capable of performing optimal routing and second data identifying the first MSC 70*a*. The trunk call connection 20 through the connected PSTN 150 is accordingly established between the first MSC 70*a* and the GMSC 30. The GMSC 30 then interrogates the HLR 50 by transmitting a MAP based signal 60 to the HLR 50. While transmitting the MAP based signal 60 to the HLR 50, the GMSC 30 further includes the first data and the second data included in the received IAM signal. The HLR 50 then determines which MSC is currently serving the mobile station 10*b* and requests a roaming number from the second MSC 70*b* (signal 80). In response, the second MSC 70*b* returns the roaming number to the HLR via another MAP based signal 100. In response to receiving the roaming number from the second MSC 70*b*, and if the first data received from the GMSC indicates that the originating MSC 70*a* is capable of performing optimal routing, an application module 210 associated with the HLR 50 compares the received data representing the first MSC 70*a* with the received roaming number representing the second MSC 70*b*. By evaluating the identities of both MSCs, the application module 210 is able to determine whether it would be more efficient to establish a call connection directly between the first MSC 70*a* and the second MSC 70*b* than to establish a call connection between the first MSC 70*a* and the second MSC 70*b* via the GMSC 30.

There are a number of factors the application module 210 may consider in making such a determination. The application module 210 may calculate fees that may be incurred as a result of establishing a direct connection between the two MSCs, and compare those fees with fees that would be incurred if the call connection is indirectly established through the GMSC 30. The less expensive call connection choice is then selected. As an alternative, the direct connection distance between the two MSCs may also be compared to the call connection distance between the two MSC through the GMSC. The shorter distance connection is then selected.

In response to a determination that it is more efficient for the first MSC 70*a* to establish a direct connection with the second MSC 70*b* serving the mobile station 10*b*, the HLR 50 transmits another connection-less signal, such as a MAP based signal 160, to the first MSC 70*a*. The transmitted signal 160 further includes the received roaming number referencing the second MSC 70*b*. Upon receiving the MAP signal 160 from the HLR 50, an application module 200 associated with the first MSC 70*a* returns an acknowledgment signal 170 to the HLR 50. The application module 200 further transmits an Integrated Service Digital Network (ISDN) User Part (ISUP) based signal 180 to release the first trunk call connection 20 that has been established as a result of the first call setup signal to the GMSC 30. Accordingly, all trunk connections between the first MSC 70*a* and the GMSC 30 are released.

Using the received roaming number representing the second MSC 70*b* serving the called party mobile station 10*b* as a destination address, the first MSC 70*a* then originates a second call setup signal directly towards the second MSC 70*b*. The second call setup signal further includes the directory number identifying the mobile station 10*b*. Because the specified roaming number is a wireline number referencing the serving MSC 70*b*, a direct call connection between the first MSC 70*a* and the second MSC 70*b* is established without performing any HLR interrogation or GMSC rerouting. After the second call setup signal 190 is received by the second MSC 70*b*, the mobile station 10*b* identified by the included directory number is accordingly paged and a speech connection 230 between the second MSC 70*b* and the mobile station 10*b* is established. Accordingly, instead of establishing multiple trunk call connections through the GMSC 30, optimal routing of an incoming call and a direct speech connection between the two MSCs is established. Furthermore, in case both mobile stations are being served by the same MSC, no trunk connection is needed. After receiving the roaming number from the HLR, the first MSC determines that the roaming number represents itself and switches internally to establish a speech connection with the called party mobile station currently roaming within its coverage area.

As another embodiment of the present invention, a different database (Optimal Routing of Incoming calls—Data Base ORI-DB) 220 connected to the HLR 50 performs the functions of the application module 210 and determines whether to forward the roaming number back to the GMSC 30 or to transmit a signal instructing the first MSC 70*a* to release the first call connection and to re-originate a new call setup signal using the received roaming number. Actual transmission of the MAP signal 160 to the first MSC 70*a* can be performed either by the HLR 50 or by the ORI-DB 220.

Figure 5:
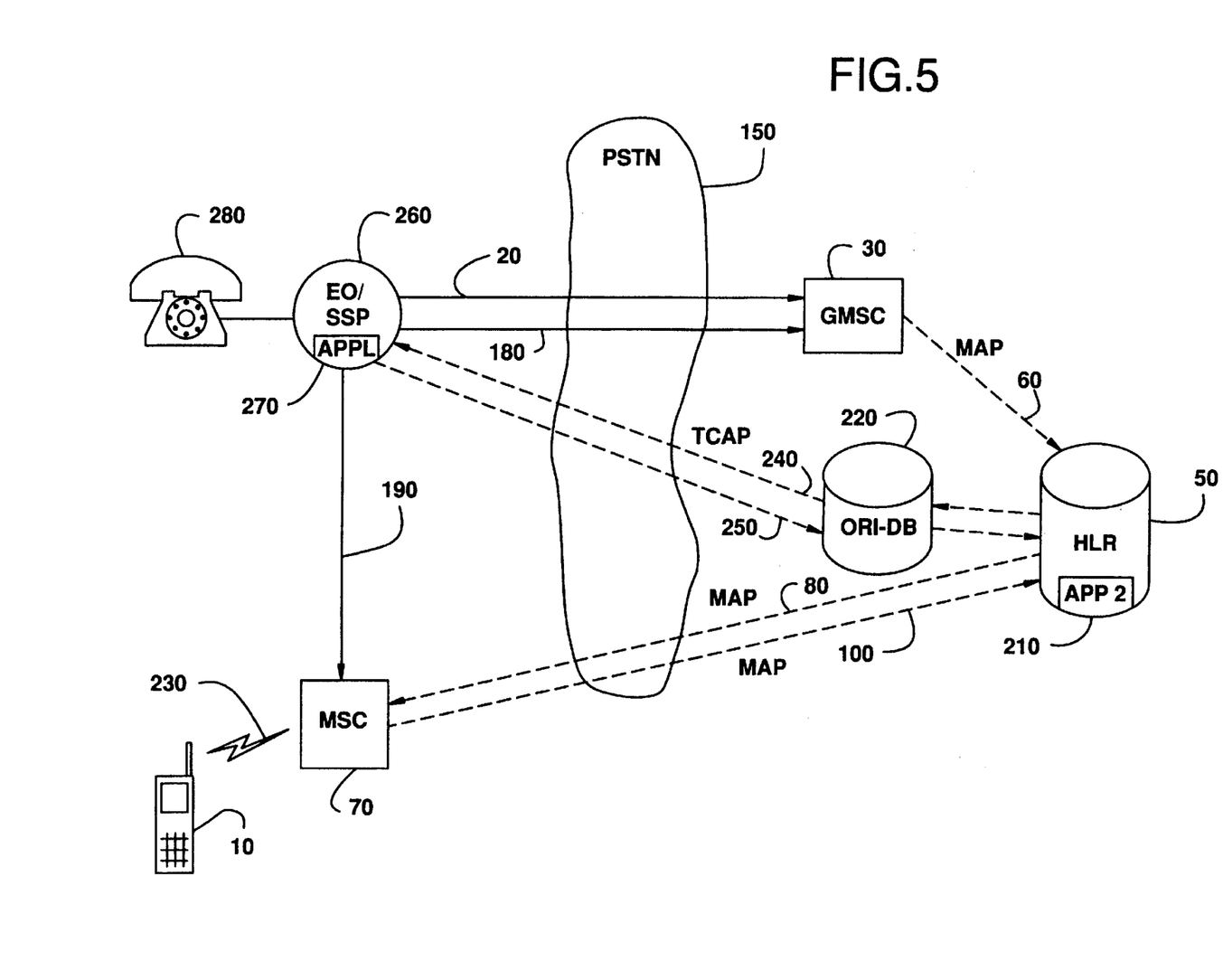
FIG. 5 is a block diagram of a telecommunications network illustrating the optimized routing of a call connection from a local exchange serving a wireline calling party terminal towards a MSC serving the destination mobile station.
Figure 6:
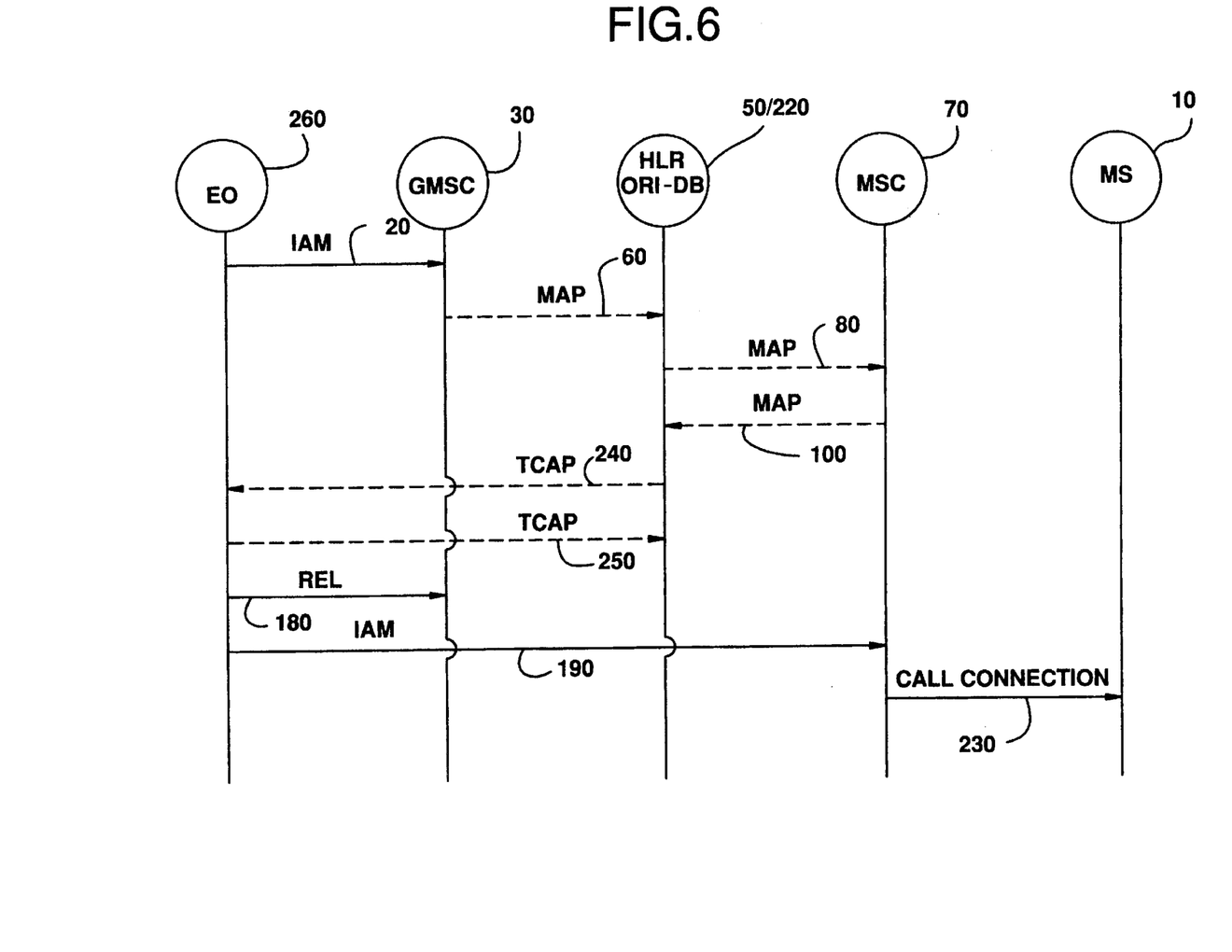
FIG. 6 is a signal sequence chart illustrating the optimized routing of a call connection from a local exchange serving a wireline calling party terminal towards a MSC serving the destination mobile station.

Reference is now made to both FIGS. 5 and 6 illustrating the optimized routing of a call connection from a wireline local exchange 260 serving a calling party terminal 280 towards a MSC 70 serving the called party mobile station 10. The wireline local exchange 260 may be an end office connected to the wireline terminal 280. It may also be a Service Switching Point (SSP) within an Intelligent Network (IN). In a manner similar to the conventional routing of an incoming call, the local exchange 260 originates an IAM signal towards the GMSC 30 serving the home PLMN associated with the called party mobile station 10. As described above, first data indicating whether the local exchange 260 is capable of performing optimal routing and second data identifying the local exchange 260 are further included in the transmitted IAM signal. Such second data may include a network address representing the local exchange 260.

As the originated IAM signal is routed to the GMSC 30, the corresponding trunk connection 20 through the connected PSTN 150 is accordingly established between the wireline local exchange 260 and the GMSC 30. The GMSC 30 then interrogates the HLR 50 by transmitting a MAP based signal 60 to the HLR 50. The received first data and second data are also included in the transmitted MAP based signal 60. The HLR 50 then determines which MSC is currently serving the mobile station 10 and requests a roaming number from the determined MSC 70 (signal 80). In response, the serving MSC 70 returns the roaming number to the HLR 50 via another MAP based signal 100. After receiving the roaming number from the serving MSC 70, and if the first data received from the GMSC indicates that the originating local exchange 260 is capable of performing optimal routing, the application module 210 associated with the HLR 50 compares the received data representing the wireline local exchange 260 with the received roaming number representing the serving MSC 70. In a manner similar to the determination made in FIG. 3, the application module 210 determines whether it would be more efficient or resourceful to establish a call connection directly between the local exchange 260 and the serving MSC 70 than to establish a call connection between the local exchange 260 and the serving MSC 70 indirectly through the GMSC 30. As an alternative, the HLR 50 may transmits the received data to the connected ORI-DB 220. The ORI-DB 220 then determines whether it would be more efficient or resourceful to establish a call connection directly between the local exchange 260 and the serving MSC 70 than to establish a call connection indirectly through the GMSC 30.

In response to a determination that it is more efficient for the local exchange 260 to establish a direct connection with the serving MSC 70 serving the mobile station 10, the ORI-DB 220 or HLR 50 transmits another connection-less signal, such as a Transaction Capabilities Application Part (TCAP) based signal 240 to the local exchange 260. Because of the fact that the local exchange 260 is not a mobile switch, a MAP based signal as described above cannot be accepted and recognized by the wireline switch. Accordingly, the transmitted TCAP signal 240 includes the received roaming number representing the serving MSC 70. Upon receiving the TCAP signal 240 from the HLR 50, an application module 270 associated with the local exchange 260 returns an acknowledgment signal 250 to the HLR 50 or the ORI-DB 220. The application module 270 further transmits an Integrated Service Digital Network (ISDN) User Part (ISUP) based signal 180 to release the first trunk call connection 20 that has been established as a result of the first call setup signal to the GMSC 30.

Using the received roaming number referencing the MSC 70 serving the called party mobile station 10 as a destination address, the local exchange 260 then originates a second call setup signal directly towards the serving MSC 70. The second call setup signal 190 further includes the directory number identifying the mobile station 10. After the second call setup signal 190 is received by the serving MSC 70, the mobile station 10 is accordingly paged and a speech connection 230 between the serving MSC 70 and the mobile station 10 is established.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for routing a call to a mobile station within a mobile telecommunications network, said method comprising the steps of:

originating a first call setup signal from a telecommunications node to establish a call connection with a mobile station;

routing said first call setup signal to a gateway mobile switching center (GMSC) serving a mobile telecommunications network associated with said mobile station, wherein said GMSC differs from said telecommunications node;

transmitting a first signal from said GMSC to a home location register (HLR) associated with said mobile station, said first signal including first data identifying said telecommunications node;

transmitting a second signal from said HLR to a mobile switching center (MSC) serving said mobile station in response to a receipt of said first signal, said second signal requesting a roaming number from said MSC;

receiving a third signal at said HLR from said MSC, said third signal including said roaming number;

determining that an optimal routing of said call connection between the telecommunications node and the MSC should be performed by evaluating said first data and said received roaming number;

transmitting a fourth signal from said HLR to said telecommunications node informing said telecommunications node to perform an optimal routing of said call connection, said fourth signal including said received roaming number; and originating a second call setup signal from said telecommunications node to said MSC using said received roaming number.

2. The method of claim 1 further comprising the step of transmitting a disconnect signal from said telecommunications node to said GMSC to disconnect a call connection established between said telecommunications node and said GMSC as a result of said first call setup signal.

3. The method of claim 1 wherein said telecommunications node comprises another mobile switching center (MSC) serving a calling party mobile station.

4. The method of claim 3 wherein said fourth signal includes a Mobile Application Part (MAP) based signal.

5. The method of claim 3 wherein said another MSC serving said calling party mobile station and said MSC serving said mobile station are the same.

6. The method of claim 1 wherein said telecommunications node comprises a local exchange serving a wireline calling party terminal.

7. The method of claim 1 wherein said step of determining that an optimal routing of said call connection should be performed is performed within a database associated with said HLR.

8. The method of claim 1 wherein said step of determining that an optimal routing of said call connection should be performed further comprises the step of determining whether a first call connection distance directly from said telecommunications node to said MSC is shorter than a second call connection distance from said telecommunications node to said MSC through said GMSC.

9. The method of claim 1 wherein said step of determining that an optimal routing of said call connection should be performed further comprises the step of determining whether first call connection charges incurred for establishing a first call connection directly from said telecommunications node to said MSC are less than second call connection charges incurred for establishing a second call connection from said telecommunications node to said MSC through said GMSC.

10. A method for routing a terminating call to a mobile station within a mobile telecommunications network, said method comprising the steps of:

receiving a first call setup signal originated from a telecommunications node and received at a gateway mobile switching center (GMSC) serving a mobile telecommunications network associated with a particular mobile station, said call setup signal requesting a call connection towards said mobile station;

transmitting a first signal from said GMSC to a home location register (HLR) associated with said mobile station requesting said HLR for a routing instruction, said first signal including data identifying said telecommunications node;

transmitting a second signal, in response to a receipt of said first signal, from said HLR to a mobile switching center (MSC) serving said mobile station requesting said MSC for a roaming number;

receiving a third signal at said HLR from said MSC, said third signal including said roaming number identifying said MSC;

determining that an optimal routing of said call connection between the telecommunications node and the MSC should be performed by evaluating said data and said roaming number;

transmitting a fourth signal from said HLR to said telecommunications node instructing said telecommunications node to release said call connection established between said telecommunications node and said GMSC as a result of said first call setup signal and to originate a second call setup signal directly towards said MSC by utilizing said received roaming number as a destination address.

11. The method of claim 10 wherein said telecommunications node comprises another mobile switching center (MSC) serving a calling party mobile station.

12. The method of claim 11 wherein said another MSC serving said calling party mobile station and said MSC serving said mobile station are the same.

13. The method of claim 10 wherein said telecommunications node comprises a local exchange serving a wireline calling party terminal.

14. The method of claim 10 wherein said step of determining that an optimal routing of said call connection should be performed is performed within a database associated with said HLR.

15. The method of claim 10 wherein said step of determining that an optimal routing of said call connection should be performed further comprises the step of determining whether a first call connection distance directly from said telecommunications node to said MSC is shorter than a second call connection distance from said telecommunications node to said MSC through said GMSC.

16. The method of claim 10 wherein said step of determining that an optimal routing of said call connection should be performed further comprises the step of determining whether first call connection charges incurred for establishing a first call connection directly from said telecommunications node to said MSC are less than second call connection charges incurred for establishing a second call connection from said telecommunications node to said MSC through said GMSC.

17. A method for originating a call connection towards a mobile station within a telecommunications network, said method comprising the steps of:

originating a first call setup signal to a gateway mobile switching center (GMSC) of a mobile telecommunications network from a telecommunications node serving a calling party terminal, said first call setup signal including, as a called party address, a first directory number associated with said mobile station;

receiving a connection-less signal at said telecommunications node from the mobile telecommunications network associated with said mobile station, said connection-less signal instructing said telecommunications node to perform optimal call connection towards said mobile station between the telecommunications node and a mobile switching center (MSC) serving said mobile station and including a second directory number representing the MSC serving said mobile station;

releasing a trunk call connection established by said telecommunications node toward said mobile telecommunications network as a result of said first call setup signal; and originating a second call setup signal from said telecommunications node to the MSC serving the mobile station with said second directory number associated with said MSC as a called party address.

18. The method of claim 17 wherein said first and second call setup signals comprise an Initial Address Message (IAM) transmitted over a Signaling System No. 7 (SS7) telecommunications network.

19. The method of claim 17 wherein said telecommunications node comprises a mobile switching center (MSC) serving a calling party mobile station.

20. The method of claim 19 wherein said connection-less signal comprises a Mobile Application Part (MAP) based signal.

21. The method of claim 17 wherein said telecommunications node comprises a local exchange serving a wireline calling party terminal.

22. The method of claim 21 wherein said connection-less signal comprises a Transaction Capabilities Application Part (TCAP) based signal.

23. A system for routing a terminating call to a mobile station within a mobile telecommunications network, said system comprising:

means for receiving, at a gateway mobile switching center (GMSC), a first call setup signal originated from a telecommunications node, said GMSC serving a mobile telecommunications network associated with a particular mobile station, said first call setup signal requesting a call connection towards said mobile station;

means for transmitting a first signal from said GMSC to a home location register (HLR) associated with said mobile station requesting for a routing instruction from said HLR, said first signal including data identifying said telecommunications node;

means for determining at said HLR an identity of a mobile switching center (MSC) currently serving said mobile station;

means for determining that an optimal routing of said call connection between the telecommunications node and the MSC should be performed by evaluating said data and said identity of said MSC; and means for instructing said telecommunications node to release said call connection established as a result of said first call setup signal and to originate a second call setup signal from the telecommunications node directly towards said MSC.

24. The system of claim 23 wherein said telecommunications node comprises another mobile switching center (MSC) serving a calling party mobile station.

25. The system of claim 24 wherein said another MSC serving said calling party mobile station and said MSC serving said mobile station are the same.

26. The system of claim 23 wherein said telecommunications node comprises a local exchange serving a wireline calling party terminal.

27. The system of claim 23 wherein said means for determining that an optimal routing of said call connection should be performed is a database associated with said HLR.

* * * * *

UNITED STATES PATENT AND TRADEMARK OFFICE
CERTIFICATE OF CORRECTION

PATENT NO. : 5,884,179
DATED : Mar. 16, 1999
INVENTOR(S) : Patel

It is certified that error appears in the above-identified patent and that said Letters Patent is hereby corrected as shown below:

Column 5, line 28  Replace "boa"
With --10a--

Signed and Sealed this

Twentieth Day of July, 1999

Attest:

Attesting Officer

Q. TODD DICKINSON

Acting Commissioner of Patents and Trademarks